April 18, 1939.　　J. J. N. VAN HAMERSVELD　　2,154,546
MACHINE TOOL
Filed April 27, 1937　　6 Sheets-Sheet 1

INVENTOR.
JOHN J. N. VAN HAMERSVELD
BY
ATTORNEYS

April 18, 1939.   J. J. N. VAN HAMERSVELD   2,154,546
MACHINE TOOL
Filed April 27, 1937   6 Sheets-Sheet 2
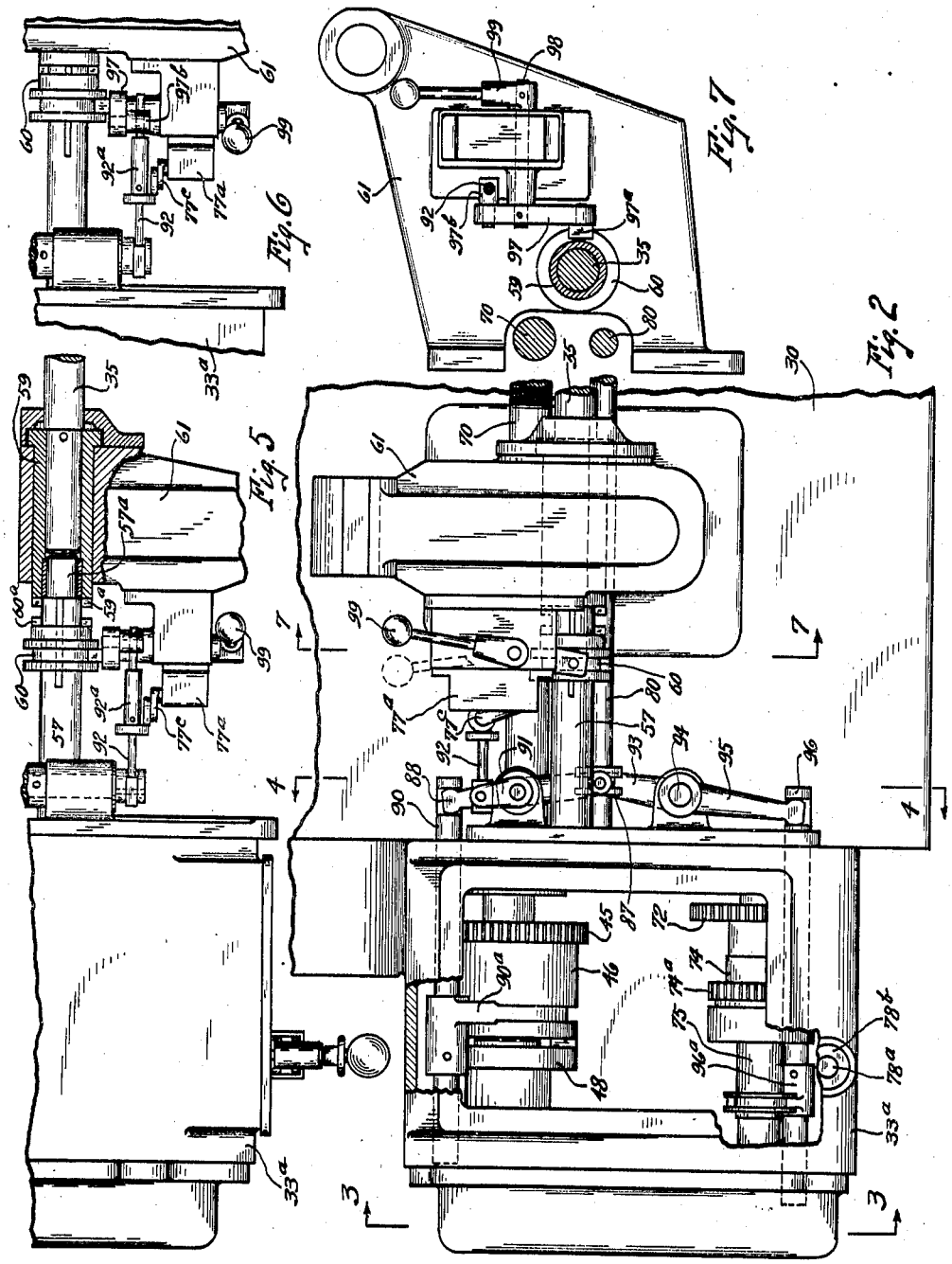
INVENTOR.
JOHN J. N. VAN HAMERSVELD
BY
Kwis Hudson & Kent
ATTORNEYS April 18, 1939. J. J. N. VAN HAMERSVELD 2,154,546
MACHINE TOOL
Filed April 27, 1937 6 Sheets-Sheet 3
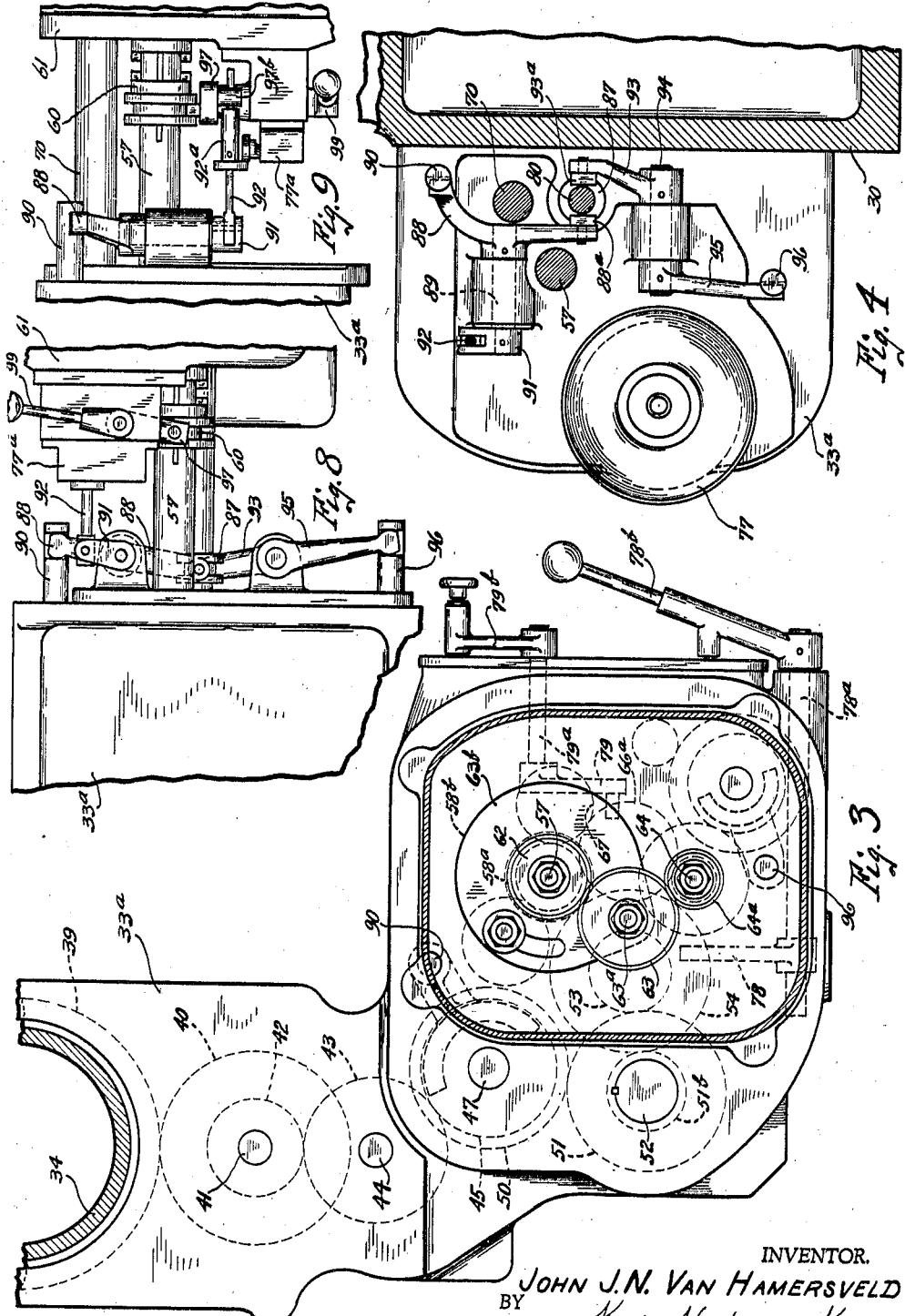
INVENTOR.
JOHN J.N. VAN HAMERSVELD
BY
Kwis Hudson & Kent
ATTORNEYS April 18, 1939.   J. J. N. VAN HAMERSVELD   2,154,546
MACHINE TOOL
Filed April 27, 1937   6 Sheets-Sheet 4
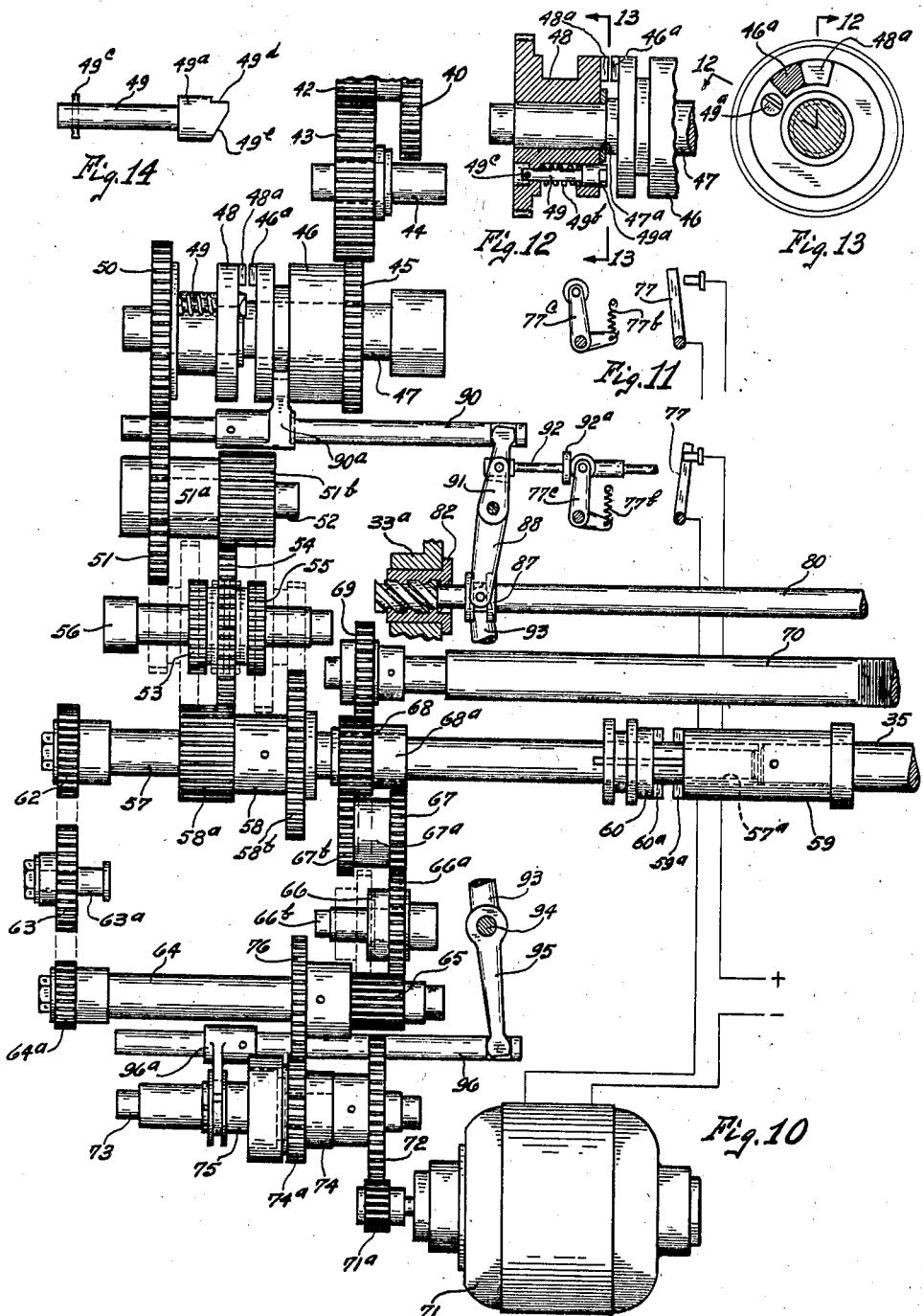
INVENTOR.
JOHN J.N. VAN HAMERSVELD
BY
ATTORNEYS

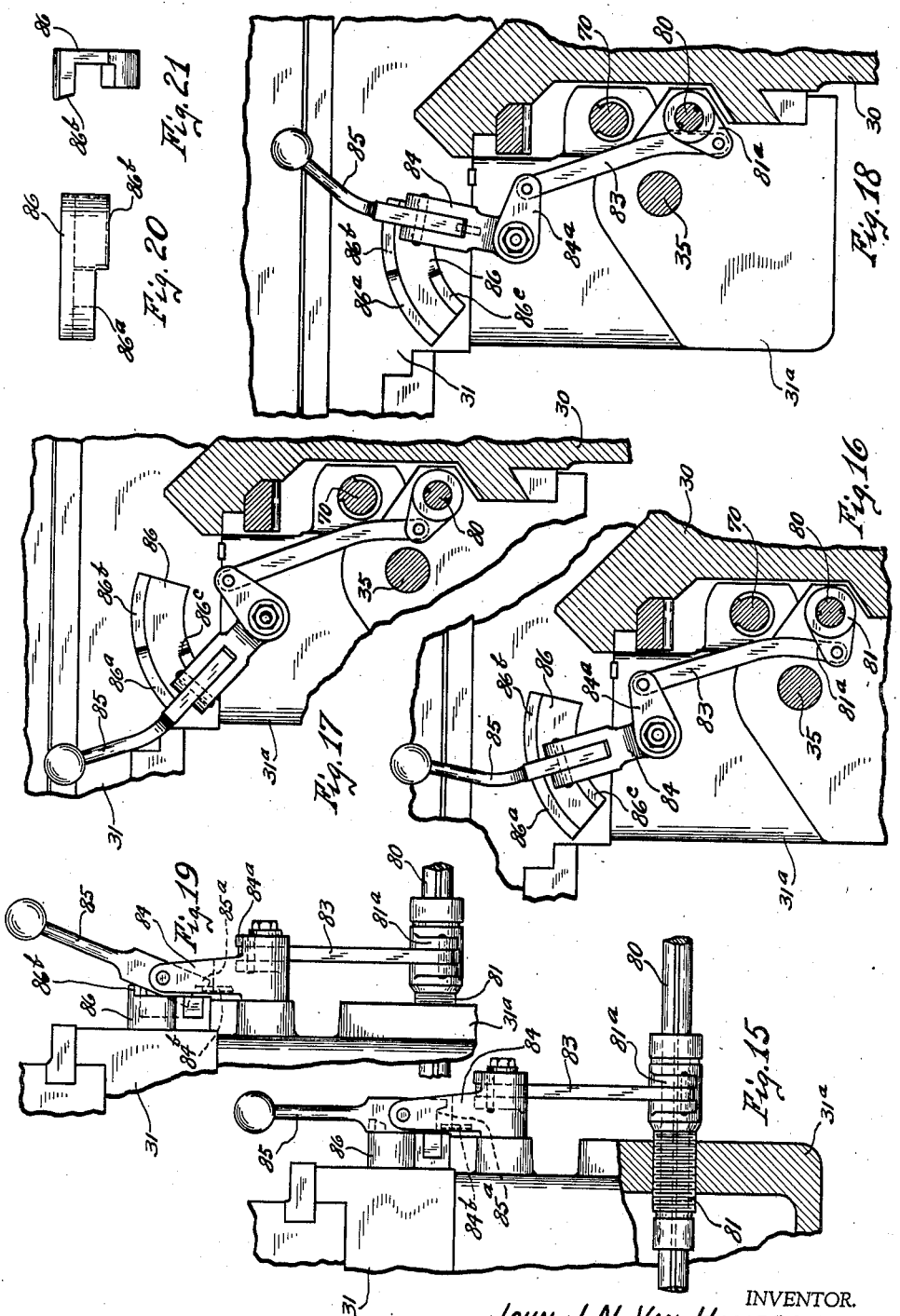

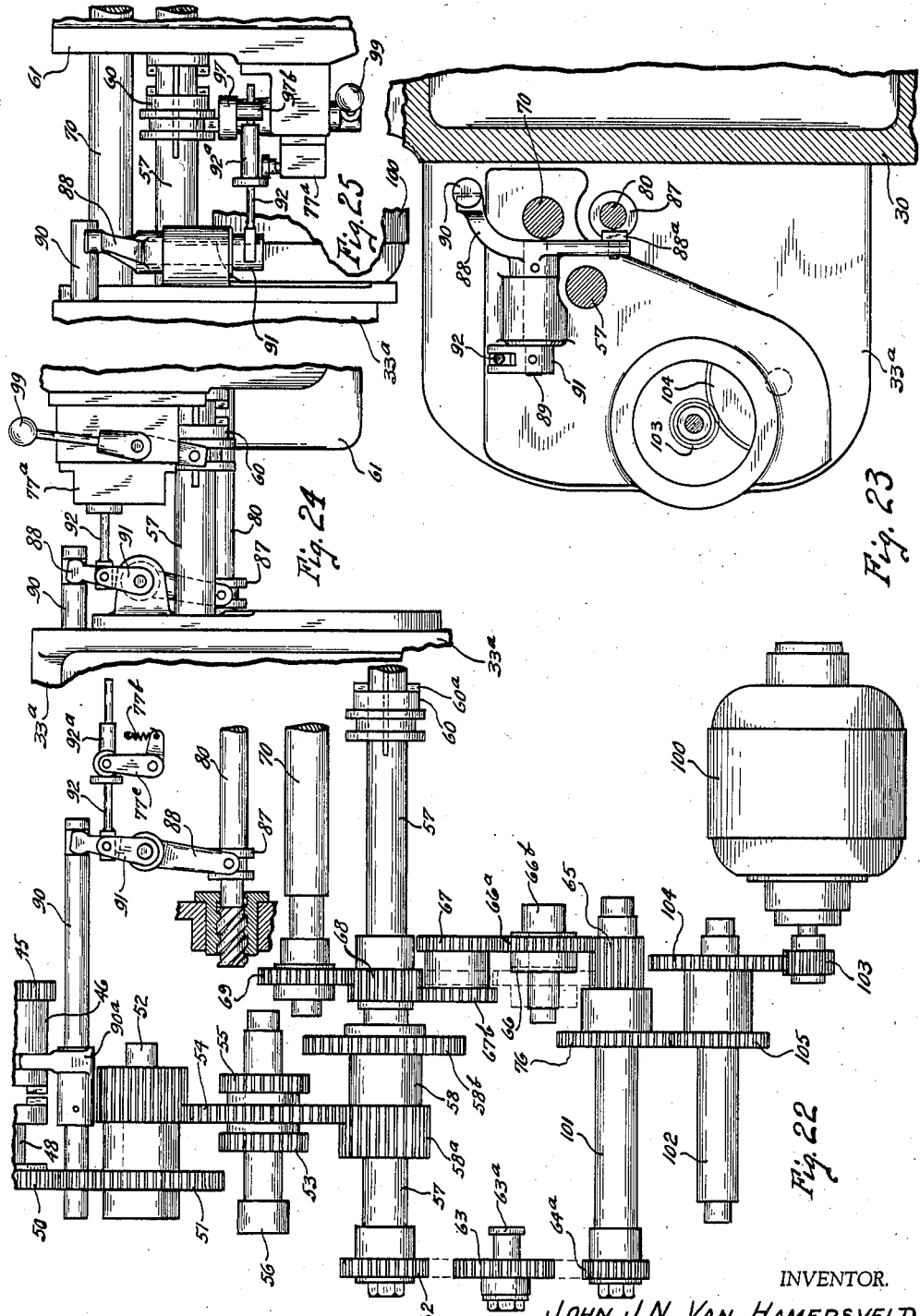

Patented Apr. 18, 1939

2,154,546

UNITED STATES PATENT OFFICE 2,154,546

MACHINE TOOL

John J. N. Van Hamersveld, Cleveland Heights, Ohio, assignor to The Warner & Swasey Company, Cleveland, Ohio, a corporation of Ohio Application April 27, 1937, Serial No. 139,243

22 Claims. (Cl. 29—47)

This invention relates to a machine tool, and particularly to a machine tool capable of performing upon a work piece a number of different machining operations such, for example, as a turret lathe.

The principal object of the invention is to provide a machine tool of the type herein specified, which can perform upon a work piece a number of different machining operations including threading operations, and which is so constructed as to be readily controlled with respect to the different operations to be performed and which is efficient in operation.

Another object is to provide a machine tool of the character specified, which includes feeding and quick motion mechanism for performing machining operations other than threading operations, and which, in addition, is equipped with a threading mechanism including a feeding device for threading, operatively connected with the previously mentioned mechanism and, in addition, independent quick motion mechanism for the threading operation to return the threading tool, said threading mechanism and the quick motion mechanism for the threading being controlled by a single lever.

Another object is to provide in a machine tool such as a turret lathe, a feed mechanism and a quick motion mechanism for a slide and a drive for said mechanisms, and in addition a screw rotatable in one direction for threading operations and driven from said drive, together with an independent drive for rotating said screw in the opposite direction for quick return motion following the threading operation, the operation of said screw in opposite directions being controlled by a single lever.

Another object is to provide in a machine tool such as a turret lathe and as specified in the object just above referred to, a single control lever for controlling the threading operation and the quick return movement of the slide after the threading operation, which lever is located in a convenient position for manipulation by the operator as, for example, in a position remote with respect to the head of the machine.

A further object is to provide a machine tool such as a turret lathe and having an independent drive for the quick return movement after the threading operation, which drive is operated only during said quick return movement and which may include an electric motor controlled by a switch having an interlocking operative association with the threading operation drive, whereby when the threading operation is terminated said switch is automatically closed to start said motor to initiate the drive for the quick return motion following the threading operation.

A further object is to provide a machine tool such as a turret lathe and having threading mechanism and an independent drive including a motor for quick motion return after the threading operation, said mechanism and said drive being controlled by a single lever, the operation of which is to terminate the threading operation switches in the motor of the independent drive for the quick return motion following the threading operation.

A still further object is to provide in a machine tool such as a turret lathe, a drive for conventional feeding movements and including a clutch, mechanism associated with said drive for a threading operation and including a clutch, and an independent drive for quick return motion after the threading operation and including a clutch, a motor and a control switch for the motor, together with an interlock between the parts hereinbefore referred to, such that when the clutch in the conventional feed drive is engaged the switch is incapable of being closed and when the clutch in the mechanism for the threading operation is engaged the switch still cannot be closed, but when the clutch for the threading mechanism is disengaged the first mentioned clutch will be automatically disengaged, the switch automatically closed, the operation of the motor started and the clutch in the independent drive for the quick return motion engaged.

Further and additional objects and advantages will become apparent during the detailed description of two embodiments of the invention which are illustrated in the accompanying drawings and wherein, Fig. 1 is a front elevational view of a machine tool embodying the invention, it being understood that although the machine tool illustrated in Fig. 1 is shown as a turret lathe, the invention could also be employed with engine lathes or other types of machine tools.

Fig. 2 is an enlarged sectional elevational view of the left hand portion of the machine tool shown in Fig. 1 on a larger scale with the cover plate for the gear box removed and certain portions shown in section.

Fig. 3 is a sectional view looking from the left hand end of Fig. 1 and is taken substantially on line 3—3 of Figs. 1 and 2 looking in the direction of the arrows.

Fig. 4 is a fragmentary sectional view taken substantially on line 4—4 of Figs. 1 and 2 looking in the direction of the arrows.

Fig. 5 is a fragmentary top plan view of Fig. 2 with a portion of the machine broken away and shown in section.

Fig. 6 is a fragmentary top plan view similar to Fig. 5 with certain of the parts shown in a different position.

Fig. 7 is a fragmentary sectional view taken substantially on line 7—7 of Fig. 2 looking in the direction of the arrows.

Fig. 8 is a fragmentary elevational view similar to Fig. 2 with certain of the parts shown in a different position.

Fig. 9 is a top plan view of Fig. 8 and is similar to Fig. 6, but with certain of the parts shown in different positions from those shown in Fig. 6.

Fig. 10 is a developed view of the gearing in the head and in the gear box and shows portions of the control shaft, the threading screw and the usual feed shaft and also the independent power drive for operating the screw for quick return after threading, together with the interlock between the different clutches and controlling parts of the machine.

Fig. 11 is a view of a portion of the developed view of Fig. 10 and shows the control switch for the motor in the independent drive for quick motion return after threading, with the switch parts in open position as distinguished from the closed position illustrated in Fig. 10.

Fig. 12 is a detail view of the single tooth clutch shown in Fig. 10 and is taken substantially along the line 12—12 of Fig. 13 looking in the direction of the arrows.

Fig. 13 is a detail sectional view taken substantially along line 13—13 of Fig. 12 looking in the direction of the arrows when the clutch shown in Fig. 12 is in engaged position.

Fig. 14 is a detached detail view of a portion of Fig. 12.

Fig. 15 is a fragmentary enlarged elevational view partly in section of a portion of the machine tool shown in Fig. 1, namely, the right hand portion of the cross slide carriage and apron.

Fig. 16 is an end view of Fig. 15 looking from the right hand side of Fig. 15 and the control lever being shown in neutral position.

Fig. 17 is a view similar to Fig. 16 with the control lever shown in the position for quick return after the threading operation.

Fig. 18 is a view similar to Figs. 16 and 17 with the control lever shown in the position for threading.

Fig. 19 is an elevational view similar to Fig. 15 with the parts in a different position and shown as in Fig. 18 in the threading position, it being noted that the control lever is shown in an outwardly tilted position corresponding to the position it takes when moved to the position shown in Fig. 18.

Fig. 20 is a detached detail plan view of the stop block with which the control lever cooperates.

Fig. 21 is a detached end elevational view of the same cam block.

Fig. 22 is a fragmentary developed view similar to Fig. 10 but illustrates a modified form of the invention.

Fig. 23 is a view similar to Fig. 4 but illustrating the modified form of the invention.

Fig. 24 is a view similar to Fig. 8, but illustrating the modified form of the invention, and Fig. 25 is a view similar to Fig. 9 but also illustrating the modified form of the invention.

Figure 1:
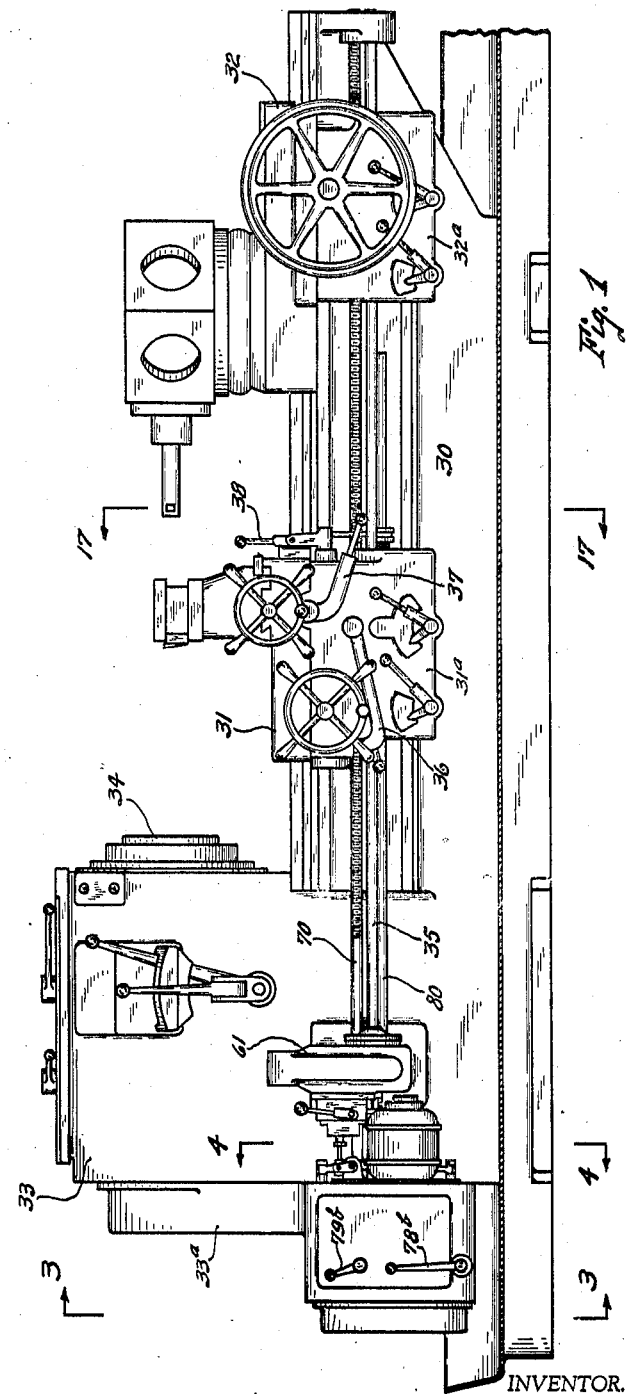

In Fig. 1 there is illustrated a turret lathe comprising a bed 30 provided with ways which slidably support a cross slide carriage 31 having a cross slide carrying a cutting tool and a turret saddle 32 mounting a turret also carrying a cutting tool. The bed 30 at one end thereof is provided with a head 33 in which is rotatably mounted the work spindle 34 and the change speed gearing for driving the work spindle and for imparting the feeding movements to the cross slide carriage 31 and the turret saddle 32. As is usual in machines of this type, the change speed gearing in the head and constituting the drive to the work spindle is controlled by suitable control levers mounted on the head but which do not form any part of the present invention. As is usual, the drive for the feed shaft 35 which extends along the front of the bed and through the aprons 31a and 32a in the cross slide carriage and the turret saddle is driven by gearing operatively connected with the work spindle and mounted in a gear box 33a supported on the head.

It will be understood that in the apron 31a of the cross slide carriage 31 suitable reduction gearing is located for imparting longitudinal feeding movement to the cross slide carriage as well as a feeding movement to the cross slide, and said movements are controlled by levers 36 and 37 respectively. The lever 36 also may control the threading movement. Likewise a quick motion mechanism might be provided for moving the cross slide carriage and the turret saddle in opposite directions after feeding movements, but such mechanism is not illustrated herein as it does not form part of the present invention.

As has been previously stated, the present invention contemplates providing in addition to the usual feed and quick motion mechanisms for the cross slide carriage, means for imparting a threading motion to the cross slide carriage and a quick return motion thereto for returning the threading tool following the threading operation. The means for imparting the threading motion is operatively associated with the drive for the feed shaft, while the mechanism for imparting the quick return for the threading tool is operated by an independent drive and by certain interlocking features or parts between the means for the quick return of the threading tool mechanism and the regular drive for the feed shaft, all as will be fully pointed out hereinafter.

A single control lever 38 which will later be referred to more in detail is mounted on the right hand side of the apron 31a of the cross slide carriage, as viewed in the drawings, and the movements of this control lever controls the means for imparting the threading movement to the cross slide carriage, the mechanism for the quick return of the threading tool and the interlocking arrangement just above referred to.

Referring to Fig. 3, and as will be well understood in the art, the spindle 34 has fixed thereto in the usual way a feed gear 39 which meshes with a large gear 40 forming part of a double gear sleeve that is freely rotatable on a shaft 41 fixedly mounted in the upper portion of the gear box 33a that is secured to the head, as will be well understood. The double gear sleeve also comprises a small gear 42 which meshes with an idler gear 43 that is freely rotatable on a shaft 44 also fixedly supported in the gear box below the shaft 41.

Referring to Fig. 10 in conjunction with Fig. 3, it will be seen that the gear 43 meshes with a gear 45 formed on a clutch member 46 that is freely rotatable on a shaft 47 and is movable endwise of the shaft, it being noted that the gear 43 has a wide face, wherefore movement of the clutch member 46 into and out of engaged position will not disengage the intermeshing relationship between the gear 43 and the gear 45. The clutch member 46 is provided with a single tooth 46a, which is adapted to have driving contact with a single tooth 48a formed on the end of a clutch member 48 that is rotatably mounted on the shaft 47 but held against endwise movement thereon by means of a collar 47a on the shaft and by means of the wall of the gear box 33a (see Figs. 2 and 12). The clutch member 48 is provided with aligned openings in which is slidably supported a pin 49 having at one end an enlarged portion forming an auxiliary tooth 49a and projecting beyond the face of the clutch member, as clearly shown in Figs. 10, 12 and 13. A spring 49b is mounted on the pin 49 and abuts the enlarged portion 49a and a portion of the clutch member 48 and serves to maintain the auxiliary tooth normally projecting beyond the right hand face of the clutch member, as viewed in the drawings, a stop pin 49c acting to limit the movement of the pin 49 under the action of the spring 49b. The enlarged portion 49a is shaped so that the side thereof adjacent to the tooth 48a is provided with a straight shouldered surface or abutting portion 49d, while the opposite side of the auxiliary tooth has an inclined or camming portion 49e (see Fig. 14).

When the clutch members are brought into engagement during the forward rotation of the work spindle, the single tooth 46a can ride over the auxiliary tooth, that is, it will depress the same by its engagement with the inclined surface 49e thereof and come into contact with the tooth 48a, as indicated in Fig. 13, to drive the clutch member 48 in a forward direction. When the spindle is being driven in the reverse direction the tooth 46a will, without disengagement of the clutch, engage the straight shouldered surface 49d of the auxiliary tooth and hence drive the clutch member 48 in the reverse direction without the necessity of making a complete revolution to engage the tooth 48a. The purpose of this construction will be brought out more fully hereinafter.

It will be noted that by employing the single tooth on each clutch member that engagement of the clutch members will always be in the same relationship when driving in the same direction, which is an important consideration in connection with the drive of the threading mechanism.

The clutch member 48 has formed thereon a gear 50 which meshes with a gear 51 formed on a gear sleeve 51a that is freely rotatable on a shaft 52 fixed in the gear box 33a. The opposite end of the sleeve 51a is provided with a wide faced gear 51b. The gear 51 is adapted to be brought into mesh with a small gear 53 of a three-step gear cone, which also includes a large or intermediate gear 54 and another small gear 55, the three-step gear cone being slidably mounted and rotatable on a shaft 56 supported in the gear box. Below the shaft 56 there is a rotatable shaft 57 which, as will later be explained, is an extension of the feed shaft 35, and said shaft 57 has fixed thereto a sleeve 58 provided at its left hand end, as viewed in the drawings, with a small wide-faced gear 58a, and at its right hand end with a large gear 58b. It will be seen that when the three-step gear cone on the shaft 56 is in the full line position, as shown in Fig. 10, the drive from the gear sleeve 51a to the gear sleeve 58 will have a one-to-one ratio, since the small gears 51b and 58a of the same size will be in mesh with the large gear 54 of the three-step gear cone which acts like an idler gear. When the three-step gear cone is shifted to the left hand dotted line position, as indicated in Fig. 10, said shaft 57 will be driven with a four-to-one ratio through the large gear 51, the small gear 53 and the large gear 54 to the small gear 58a on the shaft 57, it being understood that the large gears are twice the size of the small gears. When the three-step gear cone is shifted to the right hand dash line position, as indicated in Fig. 10, the drive from the sleeve 51a to the shaft 57 will have a one-to-four ratio and will be through the small gears 51b and 55 and the large gears 54 and 58b.

From the foregoing it will be seen that the shaft 57 can be driven at three different speeds, namely, a one-to-one ratio, a one-to-four ratio or a four-to-one ratio. As previously stated, the shaft 57 forms in effect an extension of the shaft 35, it being noted by reference to Figs. 5 and 10 that said shaft 57 has a reduced extension 57a projecting into the bore of a sleeve 59 that is fixed to the end of the feed shaft and carries at its left hand end, as viewed in Fig. 10, clutch teeth 59a which can be engaged with clutch teeth 60a formed on a shiftable clutch member 60 that is splined on the shaft 57 to rotate therewith and move endwise thereof. The reference to Fig. 5 will indicate that the sleeve 59 is rotatably mounted in a bearing casting or bracket 61 on the front of the head and that said sleeve 59 constitutes a bearing for the adjacent ends of the feed shaft 35 and the shaft 57, respectively.

It will be seen that when the clutch teeth 60a and 59a are engaged that feeding movements can be imparted to the feed shaft 35 and through the gearing in the apron of the cross slide carriage suitable feeds can be given thereto and the cross slide. The rear end, that is the left hand end as viewed in Fig. 10, of the shaft 57 is provided with a pick-off change gear 62 that meshes with an idler pick-off change gear 63 freely rotatable on a stub shaft 63a mounted on an adjustable arm 63b, see Fig. 3, said gear 63 meshing with a pick-off change gear 64a fixed on a rotatable shaft 64 mounted in the gear box. It will be understood that different sets of pick-off change gears can be mounted on the shafts 57, 63a and 64 to provide different gear ratios for cutting various United States and other standard threads. The shaft 64 at its right hand end, as viewed in Fig. 10, has fixed thereto a wide faced gear 65 which meshes with a gear 66a formed on a sleeve 66 that is rotatable on and movable axially of a fixed shaft 66b. The gear 66a is always in mesh with the wide faced gear 65 and can be selectively intermeshed with an idler gear 67 formed on a sleeve 67a that carries at its opposite end a gear 67b which intermeshes with a wide faced gear 68 formed on a sleeve 68a which is freely rotatable on the shaft 57 but held against axial movement thereon. The sleeve 66 can be shifted to the dash line position indicated in Fig. 10, wherein the gear 66a will directly intermesh with the wide faced gear 68 on the shaft 57 or it can be moved to an intermediate position, wherein the gear 66a is out of mesh with respect to the gears 67 and 68.

From the foregoing it will be seen that the sleeve 68a can be driven in either the forward or reverse directions through the pick-off change gears previously referred to. The gear 68 intermeshes with a gear 69 that is fixed to an extension of a screw 70 that extends from the gear box along the front of the bed and through the apron 31a of the cross slide carriage and the apron 32a of the turret slide saddle and which imparts threading movements thereto.

As previously stated, an independent drive is embodied in the machine for the purpose of imparting to the screw quick motion for the return of the threading tool and this independent drive comprises a motor 71 on the shaft of which is a pinion 71a that meshes with a gear 72 fixed to a rotatable shaft 73 mounted in the gear box and freely rotatable, on which is a clutch member 74 having a gear 74a. The other clutch member 75 is splined on the shaft 73 to rotate therewith and move endwise thereof. It will be seen from Fig. 10 that the clutch formed of the members 74 and 75 is, in this instance, a friction clutch, and when the members thereof are engaged the shaft 73 will drive the gear 74a while said gear, in turn, customarily meshes with a gear 76 fixed to the shaft 64. Hence the motor 71 can drive the screw 70 through the gears 71a and 72 and the gears 74a and 76, as will be readily understood, such driving of the screw 70 being in a reverse direction to the rotation thereof for the threading operation. It will also be noted that even though the sleeve 66 is shifted from the full line to the dash line position of Fig. 10 to provide for the reverse threading rotation of the screw 70, the drive to the screw 70 from the motor 71 will also be reversed to the direction of threading and hence the relationship required for quick return movement of the cutting tool is always maintained irrespective of whether or not right or left hand threads are being cut by the threading tool.

The motor 71 is controlled by means of a switch, indicated in Figs. 10 and 11 at 77, that is connected with the motor by suitable electrical connections and is mounted in a switch box 77a carried on the casting 61 (see Fig. 8). The shifting of the clutch members 46, 60 and 75 and the opening and closing of the switch 77 is controlled by interlocking means now to be referred to, it being noted that the three-step gear cone on the shaft 56 and formed of the gears 53, 54 and 55 is shifted by means of an arm 78 (see Fig. 3) straddling the gear 54 and fixed to a rockable shaft 78a, which can be rocked by a lever 78b at the front of the gear box, while the gear sleeve 66 is shifted by means of an arm 79 having a portion straddling the gear 66a, which arm is fixed to the inner end of a rockable shaft 79a that carries at its outer end a control lever 79b. A control shaft 80 is located on the front of the machine and extends from within the gear box through the apron of the cross slide carriage. The shaft 80 is rockably supported in the apron of the cross slide carriage by means of a tubular member 81 that is threaded in an opening in the wall of the apron (see Fig. 15) said shaft and tubular member having a splined connection whereby the member and shaft rotate together but the shaft can move axially of the member. The end of the control shaft 80 that extends into the gear box 33a is provided with a steep threaded portion arranged in a nut 82 that is secured in the wall of the gear box (see Fig. 10) whereby it will be noted that when the shaft 80 is rocked an endwise movement will be imparted thereto due to the engagement of the steep threaded portion with the threads of the nut.

In order to rock the shaft 80 the tubular member 81 is provided with a lever arm 81a to which the lower end of a link 83 is pivotally connected, (see Figs. 15 and 16), the upper end of said link being pivotally connected to a lever arm 84a forming part of a lever 84 that is rockably supported on the end wall of the apron. The upper end of the lever 84 is bifurcated and has pivotally mounted between the arms thereof a control handle 85 which handle has a portion extending below its pivotal connection with the lever 84 and provided at its lower end with an abutting and locating portion 85a. Cooperating with the control handle 85 is an arcuate abutting block 86 which has adjacent its upper edge two segmental shoulders 86a and 86b extending outwardly of the block different distances. The block 86 is also provided adjacent its lower edge with a segmental shoulder 86c (see Figs. 16 and 20). It will be seen that when the control handle 85 is in the upright position, as shown in Fig. 15, and is then moved inwardly it will engage the arcuate shoulder 86a and the control handle can be swung to the position shown in Fig. 17, at which time the locating portion 85a of the handle will clear the shoulder 86c at the lower edge of the block 86. When the control handle is in the position shown in Fig. 17 the control shaft 80 will have been rocked to shift the controlling elements in the gear box or adjacent thereto which have been previously described to effect the drive of the screw for quick return after the threading operation.

When the operator moves the control handle from the position shown in Fig. 17 to the position shown in Fig. 16 said handle will engage the left hand end of the shoulder 86b and stop the further movement of the control handle toward the right. Since this position of the control handle is the neutral point, it will be understood that when the engagement of the handle with the left hand end of the shoulder 86b takes place the operator will feel the same and will indicate to him that the handle is in neutral position. When the operator wishes to move the control handle from the neutral position, the position shown in Fig. 16, to the position for threading movement of the threading tool, or the position shown in Fig. 18, it is first necessary for him to pull the handle 85 outwardly to the position shown in Fig. 19 in order that it will clear the shoulder 86b, the outward movement of the handle being limited by the engagement of the lower end thereof with a pin 84b carried by the lever 84. When this has been done the operator can then move the control handle to the right to the position shown in Fig. 18. When he again wishes to bring the control handle to neutral position, he swings the same toward the left from the position shown in Fig. 18 to the position shown in Fig. 16, that is he moves the control handle until the locating portion 85a thereof abuts the right hand end of the shoulder 86c. When this position has been attained the operator can move the control handle from the inclined position shown in Fig. 19 to the vertical position shown in Fig. 15. It will be observed that positive stop means have been provided for locating the control handle in neutral position when moved from either of its operative positions. When the control handle is in neutral position the drive to the screw for the threading operation is disconnected as well as the independent drive to the screw for the quick return movement of the threading tool.

It will be appreciated that unless provision of this character were made that the operator might, when the threading operation has been completed, move the control handle from the forward position directly through neutral to the quick return position, with the result that the teeth of the threading tool might be broken or damaged by the instantaneous reversal of the screw while the threading tool is still in engagement with the work. The provision of the stop necessitates a sufficient pause in the movement of the control handle occasioned by the necessity of the operator pushing the control handle inwardly away from him to the position shown in Fig. 15 to insure a disengagement of the threading tool from the work. This is particularly true when the threading operation must terminate against a shoulder on the work piece.

The control shaft 80 adjacent its left hand end, as viewed in the drawings, has fixed thereon a shoe ring 87 in which is mounted a shoe 88a carried by the lower end of a lever 88 that is fixed intermediate its ends to a bearing shaft 89 rockably mounted in a bearing boss formed on the right hand end of the gear box 33a (see Fig. 4). The upper end of the lever 88 is provided with a rounded portion that engages in a groove in a clutch shifting shaft 90 that has fixed thereon a yoke member 90a straddling a circumferential groove in the single tooth clutch member 46 (see Figs. 2 and 10). Fixed to the end of the bearing shaft 89 opposite the end thereof to which the lever 88 is fixed is a lever arm 91 having a forked upper end which straddles the enlarged end of a rod 92. The rod 92 has fixed thereto a flanged sleeve 92a, the purpose of which will later be explained. A shoe 93a located in the shoe ring 87 diametrically opposite to the shoe 88a is carried by a lever arm 93 extending downwardly from the shoe and fixed to one end of a bearing shaft 94 that is rockably mounted in a bearing boss formed on the end of the gear box (see Fig. 4). The opposite end of the bearing shaft 94 has fixed thereto a downwardly extending lever arm 95, the lower end of which is located in a recess formed adjacent one end of a clutch shifting rod 96 which carries a yoke member 96a that straddles a circumferential groove in the friction clutch member 75, wherefore it will be seen that rocking movement of the lever 95 will impart endwise movements to the clutch member 75 to engage and disengage the friction clutch.

It will be seen that the clutch shifting rods 90 and 96 are both moved simultaneously by the control shaft 80, and hence, as will later be pointed out, the manipulation of the control handle 85 by the operator controls the engagement and disengagement of the single tooth clutch and the friction clutch, and since the movable clutch member of the single tooth clutch is on the right hand side of the fixed clutch member, while the movable clutch member of the friction clutch is on the left hand side of its companion fixed clutch member, it will be apparent that when the single tooth clutch is engaged the friction clutch is disengaged and vice versa. When the control handle 85 is in the neutral position, i. e., the position shown in Fig. 16, the single tooth clutch and the friction clutch will both be disengaged. When the control handle is moved from the position shown in Fig. 16 to that shown in Fig. 17 the control shaft 80 is rocked, so that the single tooth clutch remains disengaged while the friction clutch is engaged and the parts will be in the position indicated in Fig. 8 and the screw will be driven to impart a quick return motion to the slide. When the control handle 85 is moved from the position shown in Fig. 17 to the position shown in Fig. 18 the single tooth clutch will be engaged and the friction clutch disengaged so that the threading motion will be imparted to the screw and in this situation the parts are in the position indicated in Fig. 2.

The circuit to the motor 71 is controlled by means of the switch 77 previously referred to and this switch is normally actuated to open position by means of a spring 77b, while a rockable actuator arm 77c mounted on the same pivot as the switch plate and projecting outwardly of the switch box 77a acts to close the switch against the action of the spring 77b when said arm is rocked in the proper direction. The arm 77c is provided at its outer end with a roller adapted to contact with the flange on the flange sleeve 92a on the rod 92. It will be seen that when the control handle 85 is in the neutral position and the single tooth clutch and the friction clutch are both disengaged the switch 77 will be open, as soon as the flange on the sleeve 92a of the rod 92 has moved toward the left to allow the spring 77b to open the switch, it being recalled that the rod 92 is moved simultaneously with the clutch shifting rod 90 by the rotation of the control shaft 80. When the operator moves the control handle 85 to the threading position, the position shown in Fig. 18, the single tooth clutch is engaged, the switch remains open, while the friction clutch remains disengaged. When the control handle is moved from neutral position, at which time both clutches are disengaged and the switch is open, to the position shown in Fig. 17, namely the quick return position, the single tooth clutch remains disengaged, while the flange on the sleeve 92a fixed to the rod 92 contacts with the roller on the arm 77c and rocks said arm to effect a closing of the switch 77 and an energization of the motor 71. This closing of the switch occurs before the control handle fully reaches the position shown in Fig. 17 and before the friction clutch is engaged, so that the continued movement of the control handle to the position shown in Fig. 17 completes the engagement of the friction clutch, the motor 71 at this time having attained its normal running speed. In order to eliminate any possibility of the switch 77 being closed and the friction clutch engaged while the clutch teeth 59a and 60a for the feed shaft are engaged the following means is provided:

The shiftable clutch member 60 on the shaft 57 is shifted by means of a shoe 97a located in the circumferential groove of the member and carried by the lower end of a rockable lever 97 that is fixed intermediate its ends to a shaft 98 rockably supported in a bearing lug formed on the bracket 61 and having fixed to its outer end a control handle 99 (see Fig. 7). It will be seen that rocking movement of the control handle 99 will cause a movement of the shiftable clutch member 60 and hence an engagement or disengagement of the clutch teeth 60a and 59a, to connect or disconnect the feed shaft with respect to its drive. The lever 97 above its point of connection to the shaft 98 has secured thereto a laterally projecting rotatable shouldered pin 97b, see Fig. 7, which is provided with an opening through which the rod 92 extends. When the clutch teeth 59a and 60a are engaged and the feed shaft thus connected to its drive (which only occurs when the lever 85 is in position of threading, i. e., with the single tooth clutch engaged) the lever 99 will be in the position shown in Fig. 6 with the shouldered pin closely adjacent to the right hand end of the sleeve 92a. At this time the switch 77 is open, the single tooth clutch engaged, the friction clutch disengaged and the gear 66a is in neutral position to disengage the screw from the drive. Assuming that the operator moves the control handle 85 from the neutral position into the quick motion position shown in Fig. 17, it will be evident that should he have failed to disengage the clutch on the feed shaft by rocking the control lever 99 to the full line position of Fig. 2, that then the first portion of the movement of the control rod 92 toward the right will immediately bring the right hand end of the sleeve 92a into engagement with the side of the shouldered pin 97b and the continued movement of the control lever to the left will act to first disengage the clutch 60 on the feed shaft and then subsequently to close the switch 77 and then engage the friction clutch 75 to complete the drive to the screw for quick motion return of the threading tool, the parts then being in the position shown in Fig. 9. On the other hand when the single tooth clutch is engaged, and the gear 66a is positioned in neutral by the lever 79b and normal feeding is taking place, the operator may at will by manipulation of the control lever 99 manually engage or disengage the clutch 60 on the feed shaft.

It will be seen that the quick return motion for threading can never be engaged when the machine is set for feeding.

The embodiment of the invention which has just been described is especially well adapted for use in machines operating both with high and low speeds. However, in machines which operate only at relatively low speeds it might be preferable to employ the modification now to be described which is simplified in construction from the first described form or embodiment, (see Figs. 22 to 25).

In the modified form it will be noted that the motor 100 corresponding to the motor 71 is permanently in driving relation with the screw 70 through an unbroken train of gearing to the shaft 101 corresponding to the shaft 64 and from said shaft to the screw by the gearing 65, 66a, 67, 67b, 68 and 69, as in the first described embodiment. It will be recalled that the gear 66a can be shifted to either one of two operative positions or to a neutral position by the lever 79b. In other words, the shaft 102 corresponds to the shaft 73, but it will be noted that the friction clutch is omitted as well as the actuating mechanism for the movable friction clutch member 75 of said clutch and that the motor 100 drives the shaft 101 directly through the pinion 103 on the motor shaft and the gears 104 and 105 on the shaft 102, it being observed that the shaft 101 is provided with gears 76 and 65 as was the shaft 64. The other parts of this modified form are identical with the corresponding parts previously described in the first embodiment and are designated in the drawings by the same reference characters.

From the foregoing it will be seen that when the control handle 85 is moved from the position shown in Fig. 16 to the position shown in Fig. 17 for quick return of the threading tool, the switch 77 will be closed, the motor 100 thrown into operation and the desired quick motion imparted to the screw 70. When the control handle 85 is moved from the position shown in Fig. 16 to the position shown in Fig. 18 for threading the single tooth clutch is engaged, the switch opened and energization of the motor terminated. During the threading operation the rotor of the motor will be moved idly in the reverse direction due to the fact that it is connected with the screw by an unbroken train of gearing. It will be appreciated that the idle rotation of the rotor of the motor would in the case of very high speeds produce a considerable drag, but that in the case of relatively low speeds this drag is immaterial and does not affect the operation of the machine.

It will also be understood that when the switch is engaged the feed drive clutch will be automatically disengaged if it has not previously been disengaged by the operator.

In summary it will be noted that a machine tool embodying the invention will have the usual mechanism for imparting feeding movements and quick return movements to a slide carrying cutting tools as shown in Fig. 1, other than threading tools together with the usual control levers for controlling said mechanism, and in addition will have means for imparting a threading movement to the slide and operatively connected with the mechanism referred to and including a screw and also an independent power drive, independent of said mechanism, for imparting quick return movement to the threading tool, said means and said independent power drive being controlled by a single lever which is located in a convenient position for the operator.

It will be understood that when the machine is being used for the non-threading operations the gear 66a will be moved to a neutral or disengaged position with respect to the gears 65, 67 and 68 by the control lever 79b and that the control handle 85 will be put in the forward position so that the single tooth clutch will be engaged and the drive completed to the feed shaft through the clutch member 60 on said shaft and the shaft 57.

Supposing that the machine is to be employed for threading operations, then the gear 66a is intermeshed with the gear 65 and with either the gear 67 or the gear 68, depending on whether or not right or left hand threads are to be cut. The clutch on the feed shaft should also under such circumstances be disconnected. When this condition exists then the threading operation and the quick return motion for the threading tool can be controlled by the movement of the control handle 85, it being recalled that when the feed shaft clutch has not been disengaged that it will automatically be disengaged when the control handle is moved to the quick return position. It will be seen that during the threading operation and the control thereof by the control handle 85, said handle due to the interlocking mechanism previously explained controls the engagement and disengagement of the single tooth clutch and also the friction clutch, and, in addition, the opening and closing of the switch for the independent power drive and, as has just been referred to, performs the fourth function of disengaging the feed shaft clutch should such clutch have been left in engagement or accidentally be engaged. The employment of the single lever control for the threading operation and the quick return movement increases the efficiency of the machine and the ease with which the operator can perform his functions, while the interlock between the clutches and the switch provide an advantageous safety feature that assures the proper operation of the machine.

It will be understood that although the single control handle 85 is shown as located on the apron of the cross slide carriage, that such handle might be located on the apron of the turret slide saddle and that the screw 70 could have a driving relation with the turret slide saddle and its associated mechanism when it is desired to have the threading tool carried by the turret slide.

Although preferred embodiments of the invention have been illustrated and described herein, it should be understood that the invention is susceptible of various modifications and adaptations within the scope of the appended claims.

Having thus described my invention, I claim:

1. A machine tool comprising means for imparting feeding movements to a cutting tool, separate means for imparting threading movements to a threading tool, separate means for imparting a quick return movement to said threading tool, and a single control member for controlling said last two means and operatively connected therewith.

2. A machine tool comprising means for imparting feeding movements to a cutting tool, separate means for imparting threading movements to a threading tool, separate means for imparting a quick return movement to said threading tool and including an independent power source and a control device therefor, and a single control member operatively connected with and controlling said last two means including said control device.

3. A machine tool comprising means for imparting feeding movements to a cutting tool including a clutch, separate means for imparting threading movements to a threading tool, separate means for imparting a quick return movement to said threading tool and including an independent power source, a control device therefor and a clutch, and a control mechanism for said clutches and said device and having an operative interlocking connection therewith and controlled in turn by a single control member.

4. A machine tool comprising a bed having a slide movable thereon and adapted to carry cutting tools and threading tools, means for imparting feeding movements to said slide, separate means for imparting threading movements to said slide, separate means for imparting a quick return threading movement to said slide, and a single control member for controlling said last two means and operatively connected therewith.

5. A machine tool comprising a bed having a slide movable thereon and adapted to carry cutting tools and threading tools, means for imparting feeding movements to said slide, separate means for imparting threading movements to said slide, a power source for operating both of said means, separate means for imparting a quick return threading movement to said slide and including an independent power source, and a single control member controlling all of said means and said independent power source.

6. A machine tool comprising a bed having a slide movable thereon and adapted to carry cutting tools and threading tools, separate means for imparting feeding movements and threading movements to said slide and including a clutch, a power source for both of said means, additional means for imparting a quick return threading movement to said slide and including a clutch and an independent power source, and a single control member for controlling both of said clutches.

7. A machine tool comprising a bed having a slide movable thereon and adapted to carry cutting tools and threading tools, independent means for imparting feeding movements and threading movements to said slide and including a clutch, a power source for said means, additional means for imparting a quick return threading movement to said slide and including an independent power source, a control device therefor, and a clutch, and a single control member for controlling both of said clutches and said control device.

8. A machine tool comprising a bed having a slide movable thereon and adapted to carry cutting tools and threading tools, means for imparting feeding movements to said slide and including a power source, a feed gear train and a feed shaft, means for imparting threading movements to said slide and including a screw and a threading gear train operatively associated therewith and with said feed train, means for imparting quick motion threading movement to said slide and including a quick motion gear train operatively connected with said threading train and an independent power source, and a single control member for controlling all of said trains.

9. A machine tool comprising a bed having a slide movable thereon and adapted to carry cutting tools and threading tools, means for imparting feeding movements to said slide and including a feeding gear train having a clutch arranged therein, means for imparting threading movements to said slide and including a screw and a threading gear train operatively associated with said screw and said feeding train, means for imparting quick return threading movement to said slide and including a quick return gear train having a clutch therein and operatively associated with said threading gear train and an independent power source, and a single control member for controlling said clutches.

10. A machine tool comprising a bed having a slide movable thereon and adapted to carry cutting tools and threading tools, means for imparting feeding movements to said slide and including a power source, a feeding gear train having a clutch arranged therein and a feed shaft, means for imparting threading movements to said slide and including a screw and a threading gear train operatively associated with said screw and said feeding gear train, means for imparting quick return threading movements to said slide and including a quick return gear train having a clutch therein, an independent power source therefor including a control device for said power source, said quick motion gear train being operatively associated with said threading gear train, and a single control member for controlling said clutches and said control devices.

11. A machine tool comprising a bed having a slide movable thereon and adapted to carry cutting tools and threading tools, means for imparting feeding movements to said slide and including a feeding gear train, a clutch therein, power source and a feed shaft having a clutch thereon, means for imparting threading movements to said slide and including a screw and a threading gear train operatively associated with said screw and said feeding gear train, means for imparting a quick return threading movement to said slide and including a quick return gear train having a clutch therein, and an independent power for said gear train and including a control device therefor, said quick return gear train being operatively associated with said threading gear train, and a single control member for controlling the clutches in said feeding gear train and said quick return gear train and said control device and also functioning to automatically disengage the clutch on said feed shaft.

12. A machine tool comprising a bed having a slide movable thereon and adapted to carry cutting tools and threading tools, means for imparting feeding movements to said slide and including a feeding gear train, means for imparting threading movements to said slide and including a screw and a threading gear train, means for imparting quick return threading motion to said slide and including a power source and an unbroken gear train interposed between said power source and operatively connected with said threading train, and a single control member for controlling said last two named means including said power source.

13. A machine tool comprising a bed having a slide movable thereon and adapted to carry cutting tools and threading tools, means for imparting feeding movements to said slide and including a feeding gear train having a clutch therein, means for imparting threading movements to said slide and including a screw and a threading gear train operatively connecting said screw with said feeding gear train, a power source for said gear trains, means for imparting quick motion return threading movement to said slide and including an independent power source, a control device therefor, and an unbroken quick motion gear train interposed between said power source and said threading gear train, and a single control member for controlling said clutch and said control device.

14. A machine tool comprising a bed having a slide movable thereon and adapted to carry threading tools, a rotatable work spindle, means for imparting threading movements to said slide and including a screw and a threading gear train for operating the same and operatively associated with said spindle, a power source for said spindle, means for imparting quick motion return threading movement to said slide and including an unbroken quick motion threading gear train operatively connected with said threading gear train and independent power source for said quick motion gear train and including a control device, and a control member for controlling the means for imparting threading movements to said slide and for controlling the control device for the independent power source.

15. A machine tool comprising a bed having a slide movable thereon and adapted to carry cutting or threading tools or a work piece, means for imparting feeding movements to said slide and including a feeding gear train having a clutch therein, a power source for said gear train, means for imparting threading movements to said slide and including a screw and a threading gear train operatively associated with said screw and said feeding gear train, means for imparting quick motion return threading movements to said slide and including an independent power source and a control device therefor, and a quick motion gear train operatively associated with said power source and said threading train, and control means for said clutch and said control device and including a control rod having an interlocking connection with said clutch and said control device and being provided with a control handle.

16. A machine tool comprising a bed having a slide movable thereon and adapted to carry cutting or threading tools or a work piece, means for imparting feeding movements to said slide and including a feeding gear train having a clutch therein, a power source for said means, means for imparting threading movements to said slide and including a screw and a threading gear train operatively connected with said screw and said feeding gear train, means for imparting quick motion return threading movements to said slide and including an independent power source, a control device therefor and a quick motion gear train operatively connected with said power source and said threading gear train and having a clutch arranged therein, and control means for both of said clutches and said control device and including a rod having an interlocking operative connection with said clutches and said control device and provided with a control handle.

17. A machine tool comprising a bed having a slide movable thereon and adapted to carry threading tools or a work piece, means for imparting threading movements to said slide and including a screw, a power source and a gear train interposed between said screw and said power source and having a clutch therein, means for imparting quick motion return threading movements to said slide and including an independent power source, a control device therefor, and a gear train operatively connected to said independent power source and said first named gear train, and control means for said clutch and said control device and including a rod having an operative interlocking connection with said clutch and device and provided with a control handle.

18. A machine tool comprising a bed having a slide movable thereon and adapted to carry threading tools or a work piece, means for imparting threading movements to said slide and including a screw, a power source and a gear train operatively connected with said power source and said screw and having a clutch therein, means for imparting quick return threading movements to said slide and including an independent power source, a control device therefor, a quick motion gear train operatively connected to said first named gear train and said power source and having a clutch therein, and control means including a control rod having an operative interlocking connection with both of said clutches and said control device, said rod being provided with a control handle whereby the threading and quick return movements of the slide can be controlled.

19. A machine tool comprising a bed having a slide movable thereon and adapted to carry cutting or threading tools on a work piece, means for imparting feeding movements to said slide and including a feed shaft, a feed gear train having a clutch therein, a clutch interposed between said feed gear train and said feed shaft and a power source for said feed gear train, means for imparting threading movements to said slide and including a screw and a threading gear train operatively connected therewith and with said feed gear train, and means for imparting quick motion return threading movements to said slide and including an independent power source, a control device therefor, and a quick motion gear train operatively connected with said power source and said threading gear train, and means for engaging and disengaging the clutch in said feeding gear train, disengaging the clutch between said feeding gear train and said feed shaft and for controlling said control device and including a control rod having an interlocking operative connection with both of said clutches and said control device and provided with a control handle.

20. A machine tool comprising a bed having a slide movable thereon and adapted to carry cutting or threading tools on a work piece, means for imparting feeding movements to said slide and including a power source, a feeding gear train having a clutch therein, a feed shaft and a clutch interposed between said feed shaft and said gear train, means for imparting threading movements to said slide and including a screw and a threading gear train operatively connected to said screw and said feeding gear train, means for imparting quick motion return threading movements to said slide and including an independent power source, a control device therefor, and a quick motion gear train operatively connected with said power source and said threading gear train and having a clutch therein, and means for engaging and disengaging the clutches in said feeding gear train and said quick motion gear train and for disengaging the clutch between said feed shaft and said feed train and for controlling said control device and including a control rod having an operative interlocking connection with all three of said clutches and said control device.

21. A machine tool comprising a member movable in opposite directions, a power source and means interposed between said power source and said member for moving the latter and including a single tooth clutch, said clutch being provided on one member thereof with a depressible auxiliary tooth shaped so as to be depressed by the tooth on the other member of the clutch in one direction of rotation and to abut with and be moved by said tooth of the other member of the clutch in the opposite direction of rotation to effect movements of said movable member in opposite directions.

22. A machine tool comprising a member movable in opposite directions, means for moving said member, a control lever for said means having mounted thereon a rockable handle portion, and a control block associated with said handle portion and having shoulders on opposite edges thereof, said shoulders being located in the path of movement of the handle portion when moving with said lever and so positioned as to abut said handle portion in the neutral position of the lever, whereby said handle portion must be rocked relative to said lever to clear one or the other of said shoulders to allow movement of the lever through neutral position.

JOHN J. N. VAN HAMERSVELD.